UNITED STATES PATENT OFFICE.

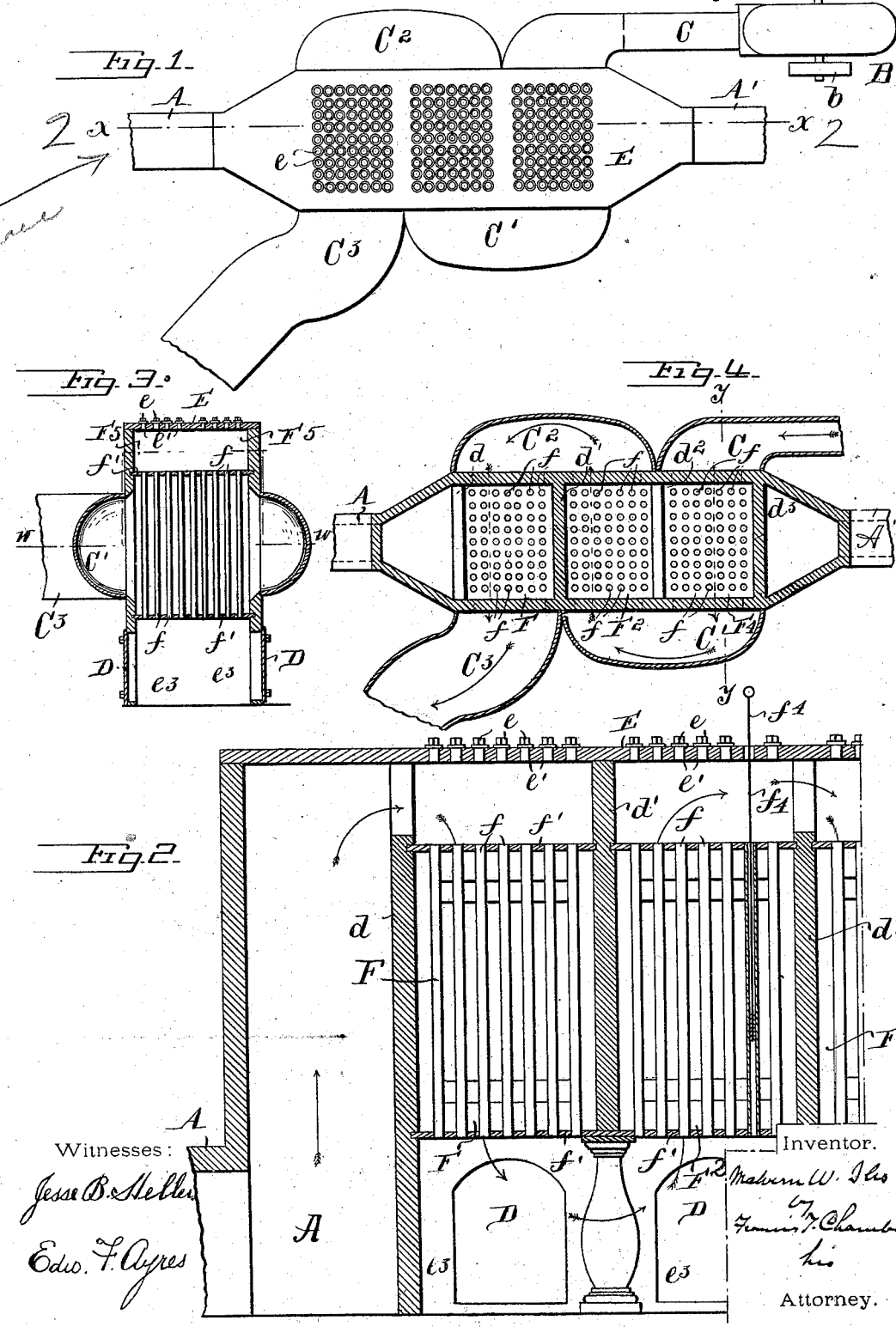

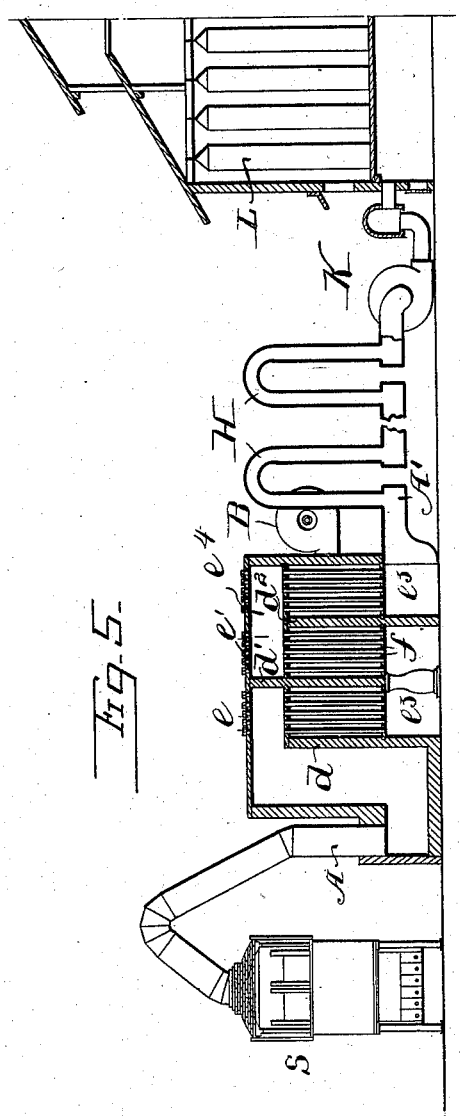

MALVERN W. ILES, OF DENVER, COLORADO.

APPARATUS FOR SAVING METALLIC FUMES.

SPECIFICATION forming part of Letters Patent No. 559,453, dated May 5, 1896.

Application filed October 28, 1893. Serial No. 489,366. (No model.)

*To all whom it may concern:*

Be it known that I, MALVERN W. ILES, a citizen of the United States, residing at Denver, in the county of Arapahoe, in the State of Colorado, have invented a new and useful Improved Apparatus for Saving Metallic Fumes, of which the following is a true and exact description, reference being had to the accompanying drawings, which form a part of this specification.

My invention relates to an apparatus for saving metallic fume driven off from metallurgical furnaces and utilizing the heat of the furnace-gases carrying said fume, and has for its object to collect the valuable metallic fume passing off with the gases from blast-furnaces, roasters, and other types of metallurgic furnaces, and also to utilize the heat of these gases preferably by heating air to be used in the twyers or in any other manner where hot air is required.

The method of my apparatus consists in cooling the current of intensely-heated gases carrying the fume and coming from metallurgic furnaces by dividing said current by passing it through a suitable conduit, a part of which consists of a multiple series of pipes and blowing a current of cold air at a high velocity directly across and between these pipes. This results in cooling the gases to a very great extent, with the effect that the volume of the gas is greatly diminished, the metallic fume carried thereby is condensed and, so to speak, precipitated in or near the pipes, and a further result is the heating of the air which cools the gases, which in its heated state can be used in the twyers for heating or in any other suitable manner.

My invention is best explained in connection with the accompanying drawings, which illustrate an apparatus for collecting fume and heating air, and in which—

Figure 1 is a plan view of an apparatus embodying my invention. Fig. 2 is a vertical section on the line $x$ $x$ of Fig. 1. Fig. 3 is a section on the line $y$ $y$ of Fig. 4. Fig. 4 is a section on the line $w$ $w$ of Fig. 3; and Fig. 5 a side view, partly in section, of a blast-furnace in connection with my improved condensing apparatus, cooling-flues, and a screen system.

S is a furnace.

A A' is a conduit or dust-flue leading from the furnace to conduct the gases and fume therefrom. $f f$ are pipes forming part of said conduit A A', which pipes are conveniently secured in tube-sheets $f'$ in the ordinary way, and in order to gain the requisite amount of surface without making the pipes too long, and also for convenience in cleaning, I prefer to arrange these pipes vertically in sets as F F$^2$, &c., opening into the chambers $e^3$ $e^4$, which form a part of the conduit A A', and to place walls $d$ $d'$, &c., so as to cause the gas and fume current to pass back and forth through all the sets of pipes. A blower B, driven by a pulley $b$ or any other air-forcing mechanism, is arranged to blow a current of air at a high velocity across and between the pipes. The air from the blower is conducted by the air-flue C so that it will first pass across the set of pipes farthest from the furnace and then across the other sets by means of the bends C' C$^2$, and finally across the set of pipes through which the gases and fume direct from the furnace are passing, and is then conveyed away by a flue C$^3$. By this arrangement the air just before it leaves the apparatus meets the pipes in which are the hottest gases, and the gas and fume as it passes through the last set of pipes is surrounded by the coolest air, whereby it is very effectually cooled and the metallic particles effectually condensed. These deposited particles tend of course to clog up the pipes $f$, and to remove these I arrange holes $e'$ in the wall E of the chamber $e^4$ in line with the pipes $f$, so that when the stoppers $e$, which normally close the holes $e'$, are removed a suitable tool, as $f^4$, can be inserted and the accumulated fume brushed out of the tubes, the chamber $e^3$ being preferably arranged below the tubes to catch the fume and from which it may be removed through the doors D.

The gases and uncondensed fume after passing through the condensing apparatus pass out through the portion A' of the conduit A A' to a set of cooling-flues, which I have indicated at H in a conventional manner, and in which the gases are further cooled. A fan K is arranged to draw the gas and fume from the condenser and cooling-flues and force it into a screen system L, where the valuable metallic particles are separated by means of the screens and the waste gases are permitted to escape.

While I have shown the pipes $f$ vertical with the fume-collecting chamber $e^3$ beneath them, it is evident that they may be arranged in any way that is found convenient.

I have found that air, blown at a velocity of from three to five thousand feet a minute, cools the gases in the pipes very effectually, and an important result of this cooling in the condenser proper and then in the cooling-flues, if necessary, is that the volume of the gases which is finally forced into the bag-houses is greatly reduced by the reduction of temperature, so that fewer bags will separate a much greater bulk of fume than when the gases enter them hot and expanded. The danger of fire in the bag-houses is also greatly lessened.

Having now described my invention, what I claim as new, and desire to secure by Letters Patent, is—

1. The combination with a metallurgical furnace and a smoke-conduit leading therefrom, of one or more multiple sets of pipes forming part of said conduit and opening into chambers $e^3$ $e^4$ at each end, said chambers also forming part of the smoke-conduit, a series of cleaning-openings $e'$ formed in the walls of the chamber $e^4$ in line with each pipe, a cool-air conduit inclosing the pipes and a blower arranged to force air through said conduit all substantially as and for the purpose specified.

2. The combination with a metallurgical furnace and a smoke-conduit leading therefrom, of one or more multiple sets of pipes forming part of said conduit set vertically and opening into chambers $e^3$ $e^4$ at each end, said chambers also forming part of the smoke-conduit, a series of cleaning-openings $e'$ formed in the walls of the upper chamber $e^4$ in line with each pipe, a cool-air conduit inclosing the pipes and a blower arranged to force air through said conduit, all substantially as and for the purpose specified.

MALVERN W. ILES.

Witnesses:
JOHN S. WILLIAMS,
P. R. MCCORMICK.